United States Patent [19]
Alexandrov et al.

[11] 4,114,835
[45] Sep. 19, 1978

[54] CARRIER FOR THE PNEUMATIC CONVEYING OF LOADS OVER A PIPELINE

[76] Inventors: Adolf Moritsovich Alexandrov, Federativny prospekt, 6, korpus 3, kv. 8; Vladimir Efimovich Aglitsky, Zatsepsky val, 6/13, kv. 61; Vladimir Nikolaevich Gvozdev, Ryazansky prospekt, 68, korpus 1, kv. 267; Dmitry Evgenievich Geints, Flotskaya ulitsa, 16, kv. 116, all of Moscow; Dmitry Rudolfovich Gun, Komsomolskaya ulitsa, 7, kv. 29, Ljubertsy Moskovskoi oblasti; Viktor Alexeevich Dokin, ulitsa Obrucheva, 57, kv. 58, Moscow; Evgeny Mikhailovich Dubner, Volgogradsky prospekt, 120, korpus 2, kv. 39, Moscow; Ilya Solomonovich Kantor, Teply Stan, mikroraion 8a, korpus 10ab, kv. 98, Moscow; Evgeny Alexandrovich Lachinov, Tashkentskaya ulitsa, 14, korpus 1, kv. 27, Moscow; Jury Arnoldovich Topolyansky, Matveevskaya ulitsa, 10, korpus 4, kv. 233, Moscow; Jury Abramovich Tsimbler, Sojuzny prospekt, 10, kv. 261, Moscow; Alexei Vadimovich Chernikin, Leninsky prospekt, 67, kv. 132, Moscow, all of U.S.S.R.

[21] Appl. No.: 809,654

[22] Filed: Jun. 24, 1977

[30] Foreign Application Priority Data

Jun. 24, 1976 [SU] U.S.S.R. .............................. 2376874

[51] Int. Cl.² .............................................. B65G 51/04
[52] U.S. Cl. ..................................... 243/32; 104/155
[58] Field of Search ........................ 243/32, 33, 34, 35, 243/39; 104/138 R, 155

[56] References Cited

U.S. PATENT DOCUMENTS

| | | | |
|---|---|---|---|
| 1,053,368 | 2/1913 | Eells | 104/155 |
| 1,183,198 | 5/1916 | Hills | 243/32 |
| 3,734,428 | 5/1973 | Alexandrov et al. | 243/33 |
| 3,952,667 | 4/1976 | Kovanov | 243/39 X |
| 4,042,190 | 8/1977 | Ueno | 243/32 |

Primary Examiner—Evon C. Blunk
Assistant Examiner—James L. Rowland
Attorney, Agent, or Firm—Fleit and Jacobson

[57] ABSTRACT

A carrier for the pneumatic conveying of loads over a pipeline the body of which is provided with longitudinal seals attached to its sides with provision for displacement in the vertical direction relative to the body and also provided with transverse seals at its end faces — a forward and a rearward seal being provided to take into account the direction in which the carrier travels. The transverse seals form, in conjunction with the longitudinal seals, spaces above and below the body communicating with the space in the pipeline before and after the body, respectively, by way of at least one opening provided in each of the forward and rearward transverse seals. The forward and rearward transverse seals are fitted to the body with provision for displacement about same in the vertical direction, and a gate arranged to close an opening in the rearward seal either partially or in full depending on the differential pressure existing at the longitudinal seals is rigidly attached to the body at its end which faces the rearward transverse seal.

4 Claims, 3 Drawing Figures

CARRIER FOR THE PNEUMATIC CONVEYING OF LOADS OVER A PIPELINE

FIELD OF THE INVENTION

The present invention relates to equipment for the pneumatic conveying of loads, and more specifically to carriers used in conjunction with such equipment. Carriers realized in accordance with the present invention can be used to advantage in pipelines of a diameter around 1 m and upwards.

DESCRIPTION OF THE PRIOR ART

Known in the art are carriers for the pneumatic conveying of loads over a pipeline consisting of a body, i.e., a container accommodated wherein is the load, which is provided with longitudinal seals running along its side walls essentially at midheight. Bridging a gap existing between the side walls of the carrier and those of the pipeline, these seals receive support, when the carrier is on the move, from guides rigidly attached inside the pipeline and are fitted to the body with provision for displacing across same in the vertical direction so as to maintain the gap between them and the guides at its minimum. Trunnions provided at the end faces of the body serve to carry a forward transverse seal at the leading end face of the body and a rearward transverse seal which, in conjunction with the longitudinal seals, form two spaces located one below the body of the carrier and the other above the body. An opening provided in the lower portion of the rearward transverse seal serves to place the space below the carrier in communication with the space in the pipeline behind the carrier when this is on the move. The forward transverse seal is also provided with an opening in its upper portion which places the space above the carrier in communication with the space in the pipeline before the carrier. Owing to such arrangement of seals and openings, a differential pressure is set up at the longitudinal seals of the carrier which is consequently capable of riding along the pipeline due to the "air cushion" effect.

In the known carriers described above, the forward and rearward transverse seals are rigidly secured to the trunnions of the body, and in pipelines of a variable gradient the tractive effort varies over a wide range, sharply increasing on the upgrades and decreasing on the downgrades. Variations in the tractive effort bring about changes in the differential pressure at the longitudinal seals and this, in its turn, results in an unstable lifting force which increases on the upgrades and decreases on the downgrades. Since the transverse seals are rigidly attached to the body, they lift or lower integrally with same when the carrier is on the move and the lifting force is fluctuating so that the gap specified between these seals and the pipeline ceases to exist completely and the seals become tightly pressed against the pipeline. The aftermath is rapid wear of transverse seals and high power requirements called for to cope with the forces of friction which can reach a magnitude rendering the conveying unfeasible.

OBJECTS AND BRIEF DESCRIPTION OF THE INVENTION

It is an object of the present invention to provide a carrier wherein the transverse seals are linked up with the body in such a way that the control of the lifting force can be effected when the carrier is on the move over a pipeline with a variable gradient.

Another object of the present invention is to extend the service life of the carrier.

A further object of the present invention is to reduce the power requirements for the conveying of carriers.

In accordance with said and other objects, disclosed herein is a carrier for the pneumatic conveying of loads over a pipeline the body of which is provided with longitudinal seals attached to the sides with provision for displacement in the vertical direction relative to the body and is also provided with transverse seals at the end faces — a forward and a rearward seal being provided to take into account the direction in which the carrier travels. The transverse seals form, in conjunction with the longitudinal seals, spaces above and below the body communicating with the space in the pipeline before and after the body, respectively, by way of at least one opening provided in each of the forward and rearward transverse seals and wherein according to the invention the forward transverse seal and the rearward transverse seal are fitted to the body with provision for displacement relative same in the vertical direction and a gate arranged to close an opening in the rearward seal either partially or in full, depending on the differential pressure existing at the longitudinal seals, is rigidly attached to the body at its end which faces the rearward transverse seal.

It is expedient that another gate is rigidly attached to the body at its end which faces the forward transverse seal and that at least one additional opening is provided in the forward transverse seal and the rearward transverse seal which places the space below the body and the space above same, respectively, in communication with the space in the pipeline. Both openings in the transverse seals are closed by non-return valves of the opposite action and nozzles, each connected with its inlet to the opening in the corresponding transverse seal, which places the space below the body in communication with the space in the pipeline and each also connected with its outlet to the corresponding gate attached to the body provided on the corresponding transverse seals in the space below the body. Such construction of the carrier enables its use for conveying in either direction.

It is further expedient that at least one through opening placing the space below the body in communication with the space above same is provided in one of the longitudinal seals and that a gate arranged to close this opening either partially or in full depending on the differential pressure existing at the longitudinal seals is attached to the body. This interconnection of the spaces below and above the body is conductive to a wider range of lifting force control.

The carrier for the pneumatic conveying of loads over a pipeline realized in accordance with the present invention is capable of maintaining the given position inside the pipeline, enhancing thus the dependability of the equipment, extending its service life and reducing power requirements.

BRIEF DESCRIPTION OF THE DRAWINGS

Below will be given a description of a specific example of the way in which the present invention can be carried into practice with reference to the accompanying drawings in which.

DETAILED DESCRIPTION OF THE INVENTION

Figure 1:
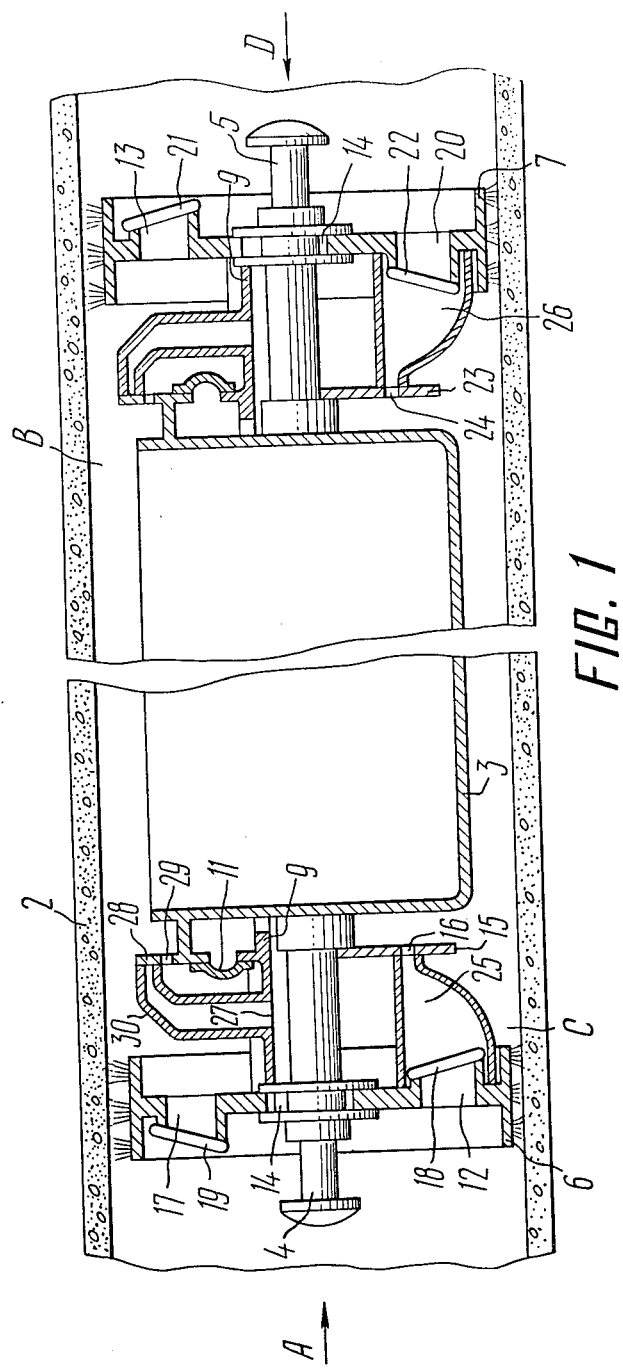
FIG. 1 is a sectional elevation of the carrier according to the invention inside a pipeline.
Figure 2:
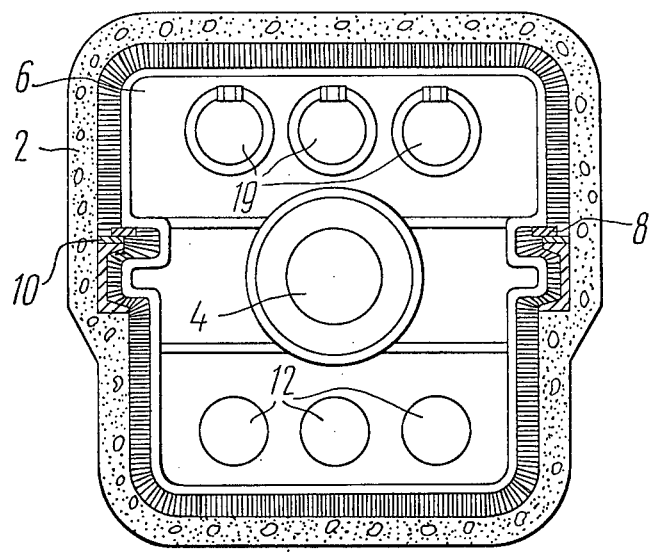
FIG. 2 is a view in the direction of arrow A of FIG. 1.

A carrier 1 (FIG. 1) for the pneumatic conveying of loads over a pipeline 2 consists essentially of a body 3 for carrying the load. Attached to the trailing and leading end faces of the body 3, travelling in the direction indicated by arrow A, are two trunnions 4 and 5, respectively. A rearward transverse seal 6 extending over the entire cross section of the pipeline 2 is fitted to the trunnion 4, and a forward transverse seal 7, also extending over the entire cross section of the pipeline 2, is mounted on the trunnion 5. Carried at the opposite sides of the body 3 and between the rearward and the forward transverse seals 6 and 7, respectively, are longitudinal seals 8 linked to each other by a component 9 which, in the example described, is made integrally with the seals. The longitudinal seals 8 receive support from guides 10 (FIG. 2) rigidly attached all the way down the pipeline 2 to its opposite sides and serve as plain bearings when the carrier 1 is on the move along the pipeline. The guides inside the pipeline are redundant when the carrier 1 rides over the pipeline on an air cushion. Each of the longitudinal seals 8 is fitted a distance apart from the body 2 and is connected thereto by means of a component 11 (FIG. 1) which allows the body 3 and the longitudinal seals 8 to displace relative to each other and seals off the gap referred to above. In the example described, the component 11 is formed of a resilient material, e.g., rubber.

The longitudinal seals 6 in cooperation with the forward and rearward transverse seals 7 and 8, respectively, form a space C below the body 3 and a space B above same. The space C communicates with the space in the pipeline 2 behind the carrier I when this is moving in the direction indicated by arrow A by way of openings 12 (FIGS. I and 2) available in the lower part of the rearward seal 6, and the space B communicates with the space in the pipeline 2 before the carrier I through openings 13, which are similar to the openings 12, provided in the upper part of the forward seal 7. The number of the openings 12 and 13 is selected so that their aggregate area of passage provides for the given lifting force. In the example described, there are a total of three openings in the forward seal 7 and an equal number of openings in the rearward seal 6. Both transverse seals 6 and 7 are fitted to their trunnions 4 and 5, respectively, with a gap 14 (FIG. 1) the width whereof is selected so as to obtain a requisite amount of relative motion between the body 3 and the seals 6 and 7.

To control the lifting force, a gate 15 with an opening 16 is rigidly attached to the body 3 at its end facing the rearward seal 6, and to enable the carrier I to shuttle over the pipeline without being turned through 180° in the horizontal plane, additional openings 17 which are similar to the openings 13 are provided in the upper portion of the rearward transverse seal 6. These openings 17 place the space B in communication with the space in the pipeline 2 before the carrier 1 when this is on the move in the direction indicated by arrow D. The openings 12 and 17 are closed with non-return valves 18 and 19, respectively. Additional openings 20 are also provided in the lower portion of the forward transverse seal 7 by way of which the space C is connected to the space in the pipeline 2 behind the carrier 1 when this is on the move in the direction indicated by arrow D, said openings 20 being identical with the openings 12. The openings 13 and 20 are closed by non-return valves 21 and 22, respectively. When the carrier 1 is travelling in the direction indicated by arrow A, the valves 18 and 21 are open while the valves 19 and 22 are closed. The travelling of the carrier 1 in the direction indicated by arrow D calls for opening the valves 19 and 22 and for closing the valves 18 and 21.

Attached to the leading end face of the body 3 is a gate 23 with an opening 24, and, furthermore, nozzles 25 and 26 are provided in the space C between the gate 15 and the transverse seal 6 as well as between the gate 23 and the transverse seal 7, respectively. The inlet of the nozzle 25 abuts against the rearward seal 6 within the zone of the openings 12 and the outlet from this nozzle abuts the gate 15 which closes the outlet from the nozzle 25 either partially or in full. The inlet of the nozzle 26 abuts against the forward seal 7 within the zone of the openings 20 and the outlet from this nozzle abuts against the gate 23 which closes the outlet from the nozzle 26 either partially or in full.

When carriers are bound to travel in just one direction, say that indicated by arrow A, or over a closed-loop pipeline in the given direction, then the lower portion of the rearward seal is provided only with those openings which place the space C in communication with the space in the pipeline behind the carrier whereas the upper portion of the forward seal is provided only with those openings which place the space B in communication with the space in the pipeline before the carrier. In this case, a gate is provided in the body at its end which faces the rearward seal and closes the opening available in this seal either partially or in full depending on the differential pressure existing at the longitudinal seals. The number of the openings the gate is pierced with can be the same as the number of openings in the lower portion of the rearward seal.

One of the longitudinal seals 8 is provided with an opening 27 (FIG. 1) through which the spaces B and C communicate with each other. Attached to the body 3 in a rigid way is a gate 28 with an opening 29. A tubular member 30 abuts the longitudinal seal 8 within the zone of the opening 27 with its inlet and also abuts the gate 28 within the zone of the opening 29 with its outlet. The gate 28 is arranged to close the outlet from the tubular element 30 either partially or in full when the body 3 displaces in the vertical direction depending on the differential pressure existing at the longitudinal seals 8.

Figure 3:
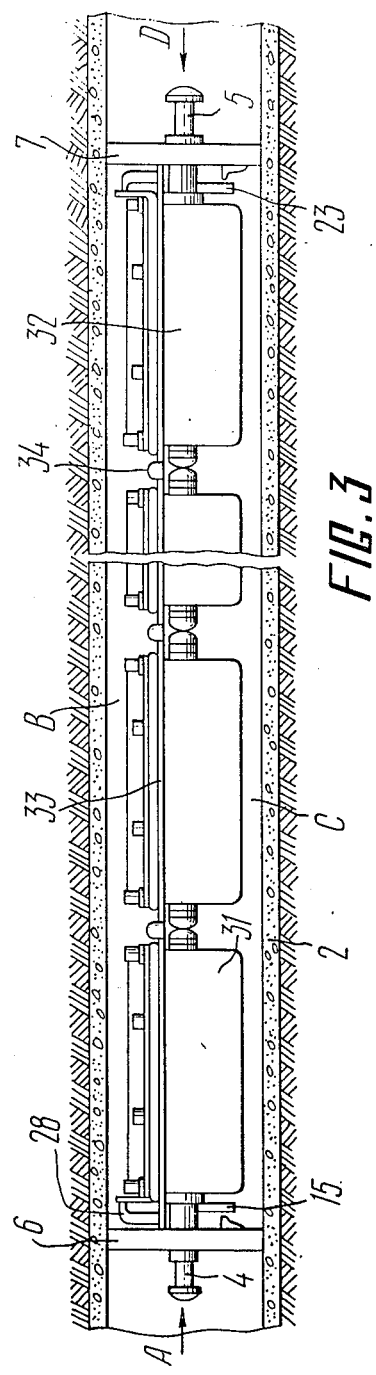
FIG. 3 is a train of carriers according to the invention.

For conveying loads in trains made up of carriers rather than in individual carriers, the transverse seals 6 and 7 (FIG. 3) as well as the gates 15 and 23 are provided only on the tail carrier 31 and on the head carrier 32, respectively, and the longitudinal seals 33 of the adjacent carriers are joined by resilient diaphragms 34.

The carrier for the pneumatic conveying of loads over a pipeline operates as follows. Compressed air, introduced into the pipeline 2 at that side of the carrier where the seal 6 is provided, sets up a differential pressure at the seals 6 and 7 which causes the carrier to travel in the direction indicated by arrow A. The valves 18 and 21 are set open at this stage while the valves 19 and 22 are closed, and, since the spaces B and C are isolated from each other, communicating with the spaces in the pipeline before the seal 7 and behind the seal 6, respectively, a differential pressure comes into play at the longitudinal seals 8 in the form of a lifting force which overcomes a fraction or the entire weight of the body and enables the carrier I to rise in the pipeline 2. When the body 3 rises, rising integrally therewith are the trunnions 4 and 5 so that the gap 14 closes with the result that the friction between the longitudinal seals 8 and the guides 10 decreases. At this stage, the outlet from the nozzle 25 is closed by the gate 15 either partially or in full.

Should an increase in the differential pressure occur in the spaces of the pipeline 2 before and behind the carrier 1, resulting in a higher tractive effort, as this is the case when the carrier travels along an up grade, the differential pressure in the spaces B and C along increases and so does the lifting force with the possibility of reaching a point when it is in excess of the weight of the carrier 1. The consequence is that the body 3 of the carrier 1 will also rise so that the gate 15 rigidly attached thereto will start closing the outlet from the nozzle 25. This will reduce the amount of air introduced into the space B and the carrier will cease to lift.

When the carrier is on the move in the direction indicated by arrow D, the valves 19 and 22 are open and the valves 18 and 21 are closed. The lifting force control is effected by the gate 23, closing the outlet from the nozzle 26, which abuts with its inlet the seal 7 within the zone of the opening 20, either partially or in full.

When the carrier travels in the direction indicated by arrow A and the openings 12 in the rearward seal 6 are completely closed while the body 3 continues to rise, the gate 28 which rises integrally with the body places its opening 29 in communication, either partially or in full, with the outlet from the tubular member 30 so that a flow of air is induced from the space C into the space B. This reduces the differential pressure in these spaces and enables the carrier to settle down until the gate 28 closes the outlet from the tubular member 30.

We claim:

1. A carrier for the pneumatic conveying of loads over a pipeline comprising a body having end faces and sides; a forward trunnion and a rearward trunnion attached to respective end faces of said body; longitudinal seals fitted at the sides of said body and displaceable relative to said body in the vertical direction; a forward transverse seal adapted to extend over the entire cross section of the pipeline and attached to said forward trunnion and displaceable relative to said forward trunnion in the vertical direction; a rearward transverse seal adapted to extend over the entire cross section of the pipeline and attached to the rearward trunnion and displaceable relative to said rearward trunnion in the vertical direction; a first space defined below said body by the pipeline, said longitudinal seals and said forward and said rearward transverse seals when said carrier is positioned in the pipeline; a second space defined above said body by the pipeline, said longitudinal seals and said forward and said rearward transverse seals when said carrier is positioned in the pipeline; at least one first opening provided in said rearward transverse seal for placing said first space below said body in communication with a space in the pipeline behind a travelling carrier; at least one first opening provided in said forward transverse seal for placing said second space in communication with a space in the pipeline before the travelling carrier; a gate attached to said body at its end which faces said rearward transverse seal for closing said opening in said rearward transverse seal either partially or in full as a result of differential pressure existing at said longitudinal seals so as to control a lifting force which acts on said body of the carrier; at least one through opening formed in one of the longitudinal seals placing the space below the body in communication with the space above the body; and a gate attached to the body for closing said through opening either partially or in full depending on the differential pressure existing at the longitudinal seals.

2. A carrier as claimed in claim 1, wherein another gate is rigidly attached to the body at its end which faces the forward transverse seal and at least one additional opening is provided in each of the forward and rearward transverse seals which places said first and second spaces, respectively, in communication with the behind and before spaces in the pipeline, non-return valves of opposite action attached to the first and additional openings in each of the transverse seals, and a plurality of nozzles, each nozzle having an inlet connected with one of the openings in one of the transverse seals which places the space below the body in communication with one of the spaces in the pipeline and having an outlet connected to the corresponding gate attached to the body.

3. A train as claimed in claim 1, wherein at least one through opening is formed in one of the longitudinal seals of one of the carriers placing the space below the bodies in communication with the space above the bodies; and wherein a gate is attached to one of said bodies for closing said through opening either partially or in full depending on the differential pressure existing at the longitudinal seals.

4. A train for the pneumatic conveying of loads over a pipeline comprising:
a plurality of individual carriers connected to each other, each carrier having a body with end faces and sides; a forward trunnion and a rearward trunnion attached to respective end faces of said body; longitudinal seals fitted at the sides of said body and displaceable relative to said body in the vertical direction; a forward transverse seal adapted to extend over the entire cross section of the pipeline and attached to the forward trunnion of the first carrier of the train and displaceable relative to said forward trunnion in the vertical direction; a rearward transverse seal adapted to extend over the entire cross section of the pipeline and attached to the rearward trunnion of the last carrier of the train and displaceable relative to said rearward trunnion in the vertical direction; a first space defined below said bodies by the pipeline, said longitudinal seals and said forward and said rearward transverse seals when said carriers are positioned in the pipeline; a second space defined above said bodies by the pipeline, said longitudinal seals and said forward and said rearward transverse seals when said carriers are positioned in the pipeline; at least one first opening provided in said rearward transverse seal for placing said first space in communication with a space in the pipeline behind a travelling train; at least one first opening provided in said forward transverse seal for placing said second space in communication with a space in the pipeline before the travelling train; a gate attached to the body of the last carrier of the train at its end which faces said rearward transverse seal for closing said opening in said rearward transverse seal either partially or in full as a result of differential pressure existing at said longitudinal seals so as to control a lifting force which acts on said bodies of the carriers.

* * * * *